United States Patent [19]

Farris et al.

[11] Patent Number: 5,793,839
[45] Date of Patent: Aug. 11, 1998

[54] COMMON CHANNEL SIGNALING EVENT DETECTION AND CONTROL

[75] Inventors: Robert D. Farris, Loudoun; Christine D. McDermott, Fairfax, both of Va.

[73] Assignee: Bell Atlantic Network Services, Inc., Arlington, Va.

[21] Appl. No.: 547,178

[22] Filed: Oct. 24, 1995

Related U.S. Application Data

[63] Continuation-in-part of Ser. No. 510,931, Aug. 3, 1995.
[51] Int. Cl.$^6$ .............. H04M 1/24; H04M 3/08; H04M 3/22
[52] U.S. Cl. .............. 379/34; 379/112; 379/114; 379/188; 379/230
[58] Field of Search .............. 379/1, 9–10, 15, 379/34, 207, 229, 221, 230, 112, 113, 114, 115, 121, 196–197, 188–189

[56] References Cited

U.S. PATENT DOCUMENTS

| | | |
|---|---|---|
| 4,811,378 | 3/1989 | Else et al. |
| 5,008,929 | 4/1991 | Olsen et al. ............ 379/112 |
| 5,351,290 | 9/1994 | Naeini et al. |
| 5,377,186 | 12/1994 | Wegner et al. |
| 5,392,335 | 2/1995 | Reeder |
| 5,475,732 | 12/1995 | Pester, III ............ 379/34 |
| 5,583,926 | 12/1996 | Venier et al. ............ 379/207 |
| 5,592,530 | 1/1997 | Brockman et al. ............ 379/34 |

*Primary Examiner*—Curtis Kuntz
*Assistant Examiner*—Duc Nguyen
*Attorney, Agent, or Firm*—Lowe, Price, LeBlanc & Becker

[57] ABSTRACT

A system and method for utilizing a common channel signaling network controlling a communications system to detect predetermined events and to execute a predetermined script upon detection of those events. This is accomplished using the common channel signaling network in conjunction with programmable and addressable monitors coupled to the common channel signaling links connected to the signaling transfer points (STPs). These monitors are programmed to trap and temporarily record predetermined data associated with specific events which it is desired to memorialize. The monitors provide an output to a control processor having an SSP capability which is linked to the STPs. The monitors are programmed either through the common channel signaling network or through a monitor port connected to the control processor to collect data including the identities of called and calling stations and data from which the duration of connection of the call may be determined. This data is utilized to calculate a toll parameter and this toll parameter is added to pre-existing toll parameter for the calling station. When the new total toll parameter equals or exceeds a predetermined toll credit parameter for the calling station corrective action is taken to prevent said total from further exceeding said predetermined toll credit.

4 Claims, 10 Drawing Sheets

5,793,839

COMMON CHANNEL SIGNALING EVENT DETECTION AND CONTROL

RELATED APPLICATIONS

This application is a continuation-in-part of application Ser. No. 08/510,931 (Attorney Docket No. 680-149), filed Aug. 3, 1995.

BACKGROUND OF THE INVENTION

1. Field of Invention

This invention relates to the detection of events such as fraud and other predetermined events in a telephone switching system and, more particularly, to a system and method for detecting and preventing or controlling fraud or other predetermined events in a telecommunications network utilizing common channel signaling.

2. History of the Prior Art

U.S. Pat. No. 4,811,378 issued to Else et al. Mar. 7, 1989, describes a fraud control system. According to the patent call communications through a switching system are disabled until answer supervision is received for the call. The system utilizes a four wire switching system that includes a fraud control unit. The fraud control unit disables communications over the established transmit portion of four wire call connection through the switching system and prevents normal communications from calling to a called line. However, normal progress signals are allowed to pass. The fraud control unit generates an idle code which is inserted into the transmit portion of the call connection from the calling to the called line. When answer supervision is received, a central processor causes the fraud control unit to remove the disabling communication on the transmit path so that normal communication may proceed.

U.S. Pat. No. 5,351,290 issued to Naeini et al. on Sep. 27, 1994, describes a telecommunications device for fraud prevention system and method. According to this patent a central office is connected to an intelligent network platform through conventional telephone lines, trunks, and/or out of band communication links. The intelligent network platform is coupled through a common carrier network to a destination telephone station. The patent describes fraud prevention utilizing communication between the intelligent network platform and a local telecommunications device comprising a memory to store various data values. The intelligent network platform, in turn, includes a memory which stores a copy of the values in the device memory. The intelligent network platform randomly generates an address which is transmitted to the local telecommunication device. The local telecommunications device retrieves data located at the address and transmits the data to the intelligent network platform as an access string prior to the placement of telephone calls using the intelligent network platform.

U.S. Pat. No. 5,392,335 issued to Robert D. Reeder on Feb. 21, 1995, for an arrangement for preventing toll fraud through an adjunct processor. According to this patent an adjunct processor sends an end of address indication, such as a pound (#) sign, along with the address, such as an extension number, to which a call is to be transferred in the switching system. The end of address indication causes the switching system to reject further addressing information from the caller, thus preventing the caller from modifying the sent address and affecting the transfer of the call to an address different from the sent address.

Modern telecommunications systems offer subscribers a large number of enhanced subscriber services and are increasingly implementing these services through the use of a system known as the Advanced Intelligent Network (AIN).

FIG. 1 is a simplified block diagram of a typical telecommunications system 11 using an Advanced Intelligent Network (AIN) 12 to provide enhanced subscriber services. The AIN 12 and its associated Signaling System Number 7 (SS7) protocol are described in the industry standard, "TR-NWT-000246, Bell Communications Research Specification of Signaling System Number 7," which is hereby incorporated by reference. A large number of Local Switches (LSs) or End Office Switches (EOs) 13a–n may be connected to a Service Switching Point/Tandem (SSP/T) 14 via multi-frequency (MF) links 15. "Tandem", as used herein, may be a local, LATA, or access tandem. The LSs 13a–n provide connections for subscribers 16a–n into the telecommunications system 11. The AIN 12 uses a system of high speed telecommunications links known as a Common Channel Signaling (CCS) network which employs the standard SS7 signaling protocol to link all of the components of the AIN 12. Standard telephony diagrams, and all figures herein, indicate links utilizing the SS7 signaling protocol as dotted lines and MF trunks as solid lines.

The components of the AIN 12 may include the SSP/T 14, one or more Signal Transfer Points (STPs) 18a–n which act as intermediate switching nodes, and one or more Service Control Points (SCPs) 19a–n. The SCPs 19 each contain a database of enhanced subscriber services which are accessed and controlled by a Service Logic Program (SLP). The SCP 19 currently utilizes a standardized protocol known as Transaction Capabilities Application Part (TCAP) for coordination of functions. The current version of the protocol required for communication with the SCP 19 is TCAP/AIN Release 0.1. The SCP 19 is described in the Bellcore standard, "TA-NWT-001280, Advanced Intelligent Network (AIN) Service Control Point (SCP) Generic Requirements," which is hereby incorporated by reference. The SCP 19 acts as a repository for enhanced subscriber services which may be accessed by any one of the LSs 13a–n. In the past, each LS had to be individually upgraded with enhanced subscriber services. With the implementation of the AIN 12, and the required communications capabilities in the LSs, new enhanced services need only be added to the SCP 19.

LSs 13 which have been upgraded to communicate utilizing the SS7 signaling protocol, and the latest release of the TCAP/AIN communications protocol, may communicate directly with an STP 18 and from there with an SCP 19 or other SSP/Ts, utilizing the high speed CCS network. LSs 13 which have not been upgraded with SS7 signaling capability, or with the TCAP/AIN communications protocol, must communicate over lower speed MF trunks 15 with the SSP/T 14 which, in turn, utilizes the SS7 signaling protocol, the TCAP/AIN communications protocol, and the CCS network to communicate with the STPs 18 and the SCPs 19. Dependence on MF trunks for access to the AIN 12 can substantially lengthen the time required to retrieve subscriber services, and ties up an expensive MF trunk which remains open and occupied during the retrieval period. The message flow utilized to retrieve an enhanced subscriber is described in more detail in conjunction with FIG. 4 below.

Another transaction often carried out utilizing the CCS network is call setup. Call-setup messages utilize a call-setup protocol known as the Integrated Services Digital Network (ISDN) User Part (ISUP) call-setup protocol. The ISUP call-setup protocol is described in the Bellcore standards, "TR-NWT-000317, Switching System Generic Requirements for Call Control Using the Integrated Services Digital Network User Part (ISDNUP)", "TR-NWT000394, Switching System Generic Requirements for Interexchange Carrier Interconnection Using the Integrated Services Digital Network User Part (ISDNUP)", and "TR-NWT000444, Switching System Requirements Supporting ISDN Access Using the ISDN User Part", which are hereby incorporated by reference.

FIG. 2 is a simplified block diagram illustrating a typical message flow utilized for call setup between two local telephone switches (LSs) 13 and 23 which have not been upgraded to utilize the ISUP call-setup protocol. Each non-ISUP LS is typically connected through a MF trunk 15 to an associated SSP/T. Thereafter, a series of ISUP messages is sent back and forth between an originating SSP/T 14, associated with a calling subscriber 16, and a destination SSP/T 24, associated with the called subscriber 21. The ISUP messages during call setup include an Initial Address Message (IAM) 22, an Address Complete Message (ACM) 25, an Answer Message (ANM) 26, a Release Message (REL) 27, and a Release Complete Message (RLC) 28. The ISUP messages are routed via the STP 18.

Many LSs in use today have been upgraded to utilize the ISUP call-setup protocol. FIG. 2a is a simplified block diagram illustrating a typical message flow utilized for call setup between two local telephone switches (LSs) 13 and 23 which have been upgraded to utilize the ISUP call-setup protocol. This upgrade allows ISUP-capable LSs to bypass the MF trunk link to the SSP/T, and communicate directly through the STP 18. Thus, the LS may perform call setup entirely over the CCS high speed telecommunications network. The CCS network is capable of transmitting at much higher data rates than multi-frequency (MF) trunks, and call setup can be completed over the CCS network much faster and more efficiently than in the past.

When utilizing the SS7 signaling protocol and the ISUP call-setup protocol for call setup, out-of-band signaling messages replace Multi-frequency (MF) and other in-band interoffice signaling mechanisms on selected circuits. The out-of-band messages are used to report circuit seizure and to transport address information, answer supervision, circuit release, etc. Thus, the network use of the SS7 signaling protocol for circuit-switched call connection and release differs fundamentally from traditional in-band circuit signaling. Instead of sending information on the facilities used for subscriber-to-subscriber communication, the switching system sends signaling information via a separate signaling network. The SS7 signaling protocol thereby allows switching systems to exchange information related to a circuit-switched connection even when the circuit is in the conversation mode.

FIG. 3 is a flow chart illustrating the typical manner in which a call is set up via the ISUP call-setup protocol, for both non-ISUP LSs and ISUP-capable LSs. At step 101, a calling subscriber 16 (FIGS. 2 and 2a) dials the telephone number of a distant subscriber 21. At step 102, if the LSs are not ISUP-capable, the call is routed over MF trunks to an originating SSP/T 14 at step 103. At step 104, ISUP call setup is invoked in the SSP/T 14 which then recognizes the dialed number as a number which requires ISUP routing, and seizes an ISUP trunk at 105. At step 106, the originating SSP/T 14 then utilizes the ISUP call-setup protocol to send an Initial Address Message (IAM) 22, via the STP 18, to a destination SSP/T 24, asking for the status of the dialed subscriber's phone 21. At step 107, the destination SSP/T 24 queries the destination LS 23 about the status of the called subscriber's phone 21. The destination LS 23 determines the status of the called subscriber's phone 21, i.e., busy, idle, forwarded, out of service, etc., at step 108, and returns this status to the destination SSP/T 24. At 109, the destination SSP/T 24 returns, via the STP 18, an Address Complete Message (ACM) 25 to the originating SSP/T 14, containing the status of the called subscriber's phone 21. The originating SSP/T 14 receives the ACM 25 and at step 110, the destination SSP/T 24 returns, via the STP 18, an Answer Message (ANM) 26 to the originating SSP/T 14 indicating that a MF trunk should be set up between the two SSP/Ts 14 and 24. At step 111, the MF trunk 15 between the originating SSP/T 14 and the destination SSP/T 24 is connected thereby providing speech capability between the calling subscriber 16 and the called subscriber 21. Once the call is terminated at step 112, a Release Message (REL) 27 is sent from the switch serving the first subscriber to hang up, to the switch serving the other subscriber. In response, a Release Complete Message (RLC) 28 is returned.

If, however, at step 102 it was determined that the LSs are ISUP-capable, then the message flow moves to step 113 where ISUP call setup is invoked in the originating LS 13. The originating LS 13 recognizes the dialed number as a number which requires ISUP routing and seizes an ISUP trunk at 114, and at 115 sends an IAM 22 to the destination LS 23 via the STP 18 requesting the status of the dialed subscriber's phone 21. At 116, the destination LS 23 determines the status of the dialed subscriber's phone and returns an ACM 25 to the originating LS 13 containing the status. At step 117, the originating LS 13 returns an ANM 26 indicating that a MF trunk should be set up between the two SSP/Ts 14 and 24. At step 118, the MF trunk 15 between the originating SSP/T 14 and the destination SSP/T 24 is connected thereby providing speech capability between the calling subscriber 16 and the called subscriber 21. Once the call is terminated at step 119, a REL 27 is sent from the switch serving the first subscriber to hang up, to the switch serving the other subscriber. In response, a Release Complete Message (RLC) 28 is returned.

FIG. 3a is a message flow diagram illustrating the flow of messages from a non-ISUP LS 13 to an ISUP-capable LS 23 during call setup and call release. At 201, the non-ISUP LS 13 seizes an MF trunk to the SSP/T 14. At 202, the SSP/T 14 sends an Initial Address Message (IAM) to the STP 18 which forwards it to the SSP/T 24 serving the called subscriber 21. At 204, the IAM is sent to the ISUP-capable LS 23 serving the called subscriber 21.

An Address Complete Message (ACM) is returned to the SSP/T 24 at 205. At 206, the ACM is sent to the STP 18 where it is forwarded to the SSP/T 14 at 207. An Answer message (ANM) is returned from the LS 23 to the SSP/T 24 at 208. At 209, the ANM is sent to the STP 18 where it is forwarded to the SSP/T 14 at 211. At 212, an answer signal is sent over the MP trunk to the non-I SUP LS 13.

Termination of the call is begun after the first subscriber hangs up (in this example, subscriber 16a). At 213, a release signal is sent over the MF trunk from the non-ISUP LS 13 to the SSP/T 14. A Release message (REL) is sent from the SSP/T 14 to the STP 18 at 214 which forwards the REL to the SSP/T 24 at 215. At 216, the REL is received by the LS 23 which returns a Release Complete Message (RLC) to the SSP/T 24 at 217. At 218, the SSP/T 24 sends the RLC to the STP which forwards the RLC to the SSP/T 14 at 219. At 221, a release complete signal over the MF trunk results in the disconnection of the call.

Referring again to FIG. 1, it can be seen that LSs 13a–n may access the AIN 12 either through MF trunks 15 and the SSP/T 14, or directly through SS7 links 17 to the STP 18. The message flow involved in determining the type of access, and in the method of service retrieval from the database in the SCPs 19, is shown in the flow diagram of FIG. 4. At step 121, a calling subscriber 16a (FIG. 1) dials the telephone number of a called subscriber 16n. At 122, it is determined whether or not the originating LS 13a has been upgraded to utilize the SS7 signaling protocol. If not, then the LS cannot directly access the AIN 12, and the signal is routed, at step 123, to the associated telephone Service Switching Point/Tandem (SSP/T) 14 via a low speed MF trunk 15. At step 124, AIN service is invoked in the SSP/T 14 which recognizes the dialed number as an AIN subscriber at 125. At step 126, the SSP/T 14 sends a Query message via the STP 18 to the SCP 19 requesting call processing instructions. The SCP performs a database lookup on the called subscriber's service that is being invoked at step 127, and then returns routing instructions to the SSP/T 14 at step 128. This response contains all of the information that is necessary to route the call (i.e., routing number, carrier, billing number, etc.). The SSP/T 14 receives the routing instructions from the SCP 19, and completes the call at step 129 by setting a MF trunk 15 between the calling subscriber 16a and the called subscriber 16n.

If, however, at step 122 it is determined that the LS is SS7-capable, then the message flow moves to step 131 where it is determined whether or not the LS has been upgraded with the latest release of the TCAP/AIN communications protocol. If not, then the flow again moves to step 123 where the signal is routed to the associated SSP/T 14 via MF trunk 15. Steps 124 through 129 are then utilized to retrieve the enhanced subscriber service.

If, at step 131, it is determined that the LS has been upgraded with the latest release of the TCAP/AIN communications protocol, then the LS may directly access the AIN 12. At step 132, AIN service is invoked in the LS which recognizes the dialed number as an AIN subscriber at 133. At step 134, the LS sends a Query message via the STP 18 to the SCP 19 requesting call processing instructions. The SCP performs a database lookup on the called subscriber's service that is being invoked at step 135, and then returns routing instructions to the LS 13 at step 136. This response contains all of the information that is necessary to route the call (i.e., routing number, carrier, billing number, etc.). The LS 13 receives the routing instructions from the SCP 19, and completes the call at step 137 by setting a MF trunk 15 between the calling subscriber 16a and the called subscriber 16n.

The preceding background discussion of the operation of the SS7 common channel signaling network paraphrases a discussion in U.S. Pat. No. 5,377,186. The contents of that patent are herein incorporated in their entirety by reference.

It would be a distinct advantage to have a system for detecting, preventing or controlling fraud or other predetermined events utilizing the common channel signaling network in a manner which does not require common channel signaling network access to an SCP. The present invention provides such a system.

SUMMARY OF THE INVENTION

In one aspect the present invention is a system for utilizing the SS7 or common channel signaling network to detect predetermined events and block or control those events from their incipiency. By way of example the invention provides an improved system to detect and abort predetermined calls, such as calls from a specific subscriber telephone to a class of subscriber stations, i.e., foreign or long distance calls. As another example it may be desired to block all calls between a pair of predetermined subscriber stations in excess of a specified number per time period (day, week, month, etc.). This is accomplished utilizing the CCS or SS7 network in conjunction with programmable monitors associated with the CCS links connected to the STPs and control processors for those monitors. According to the invention these monitors are programmed to trap and temporarily record predetermined data associated with specific events which it is desired to block or control. The monitors provide an output to an event control processor having an SSP capability which is linked to the STPs. According to one embodiment of the invention, the event control processor reacts to the trapped information to block or control specified calls via CCS control signals to switches in the network. According to another feature of the invention, the event control processor communicates with the monitors either via the STP CCS links or via connection to a controller for the monitors.

Another aspect of the present invention is to provide an effective system to monitor toll usage for customers that have been deemed a credit risk based either on their history as a telco customer or based on a credit evaluation at the time that they apply for telco service. The system involves the maintenance of a data base of customer phone numbers and their corresponding credit limits. The system accumulates inter and intra LATA toll minutes of use for these numbers along with the applicable billing information and issues an alert when the customer has reached their predetermined limit. The usage is monitored on a real time basis and according to a preferred embodiment of the invention this is advantageously accomplished through monitoring of the common channel signaling system.

While the desired information is of the same general type as accumulated by AMA procedures and in the journals of the switch, the AMA approach is not actually real time, the problem being that the journals of the switch are relatively slow. Tapes have to be sent out and it is necessary to have data links into the switch. Billing is currently accomplished in this manner. If the switch sees a 1+ or a 0+ call it knows that it has to record the information and it simply records the dialed digits, the originating office equipment and phone number. It does a time stamp and records the trunk group. Because the trunk group usually now identifies an interexchange carrier (IXC), it is known which IXC has the call, the time that it was initiated and, by the directory number, its destination. Such information is generally sufficient because much of such information is collected and recorded for the interexchange carriers. One of the reasons that such a system is still popular is because interexchange carriers generally do not now use common channel signaling. While common channel signaling appears to be the route of choice for signaling in use by most local exchange carriers (LECs), the interexchange carriers come under different tariffs which are based on Feature Group A, B, C, D and E, which still use inband signaling and ANI information.

By way of example, if a 1+ call is made, the interexchange carrier CIC code, a preliminary 5-digit code which identifies the carrier, leads to the IC's trunk. The trunk group is identified and the signal information is sent inband over the same trunk facility that the call or voice travels. The call goes through, the trunk at the interexchange carrier is seized, and a wink or a reverse of the tip and the ring is performed. This indicates that there is an answer. This actuates a relay or software indication that indicates that the call can be billed. When the call is completed the same thing occurs. This tells the originating office that on-hook has occurred and that the second part of the billing can be entered. The processor now has the termination, searches for and finds the origination and its time, has the called number, and can consult the billing and routing tables to bill the call.

According to the present invention fraud can now be monitored, detected, and acted upon on a real time basis using a monitored common channel signaling approach. A 0+ and a 1+ trigger is set in the SSP/switch to cause the origination of an informational TCAP message. This message contains the initially desired billing information and is transmitted through the common channel signaling network to be recorded at one or more predetermined storages in the network. This may be at an ISCP, at a coin detection center like device, at an intelligent peripheral (IP), and according to a preferred embodiment of the invention, at the fraud or event detection center. The information contained in the informational or remarks portion of the TCAP message includes the initial billing and routing information. This comprises identification of the calling and called directory number and the time of origination of the triggering sequence. This can be used to establish a per charge rate.

When the call is concluded another CCIS signal is dispatched and the time and duration of the call may then be ascertained. Knowing the time of day, the originating or calling station, the destination or called station, and the call duration, a pseudo-billing can be determined. This pseudo-billing can then be added to the preaccumulated billings maintained for that customer in a database of such records. As previously stated, such a database is maintained for pre-identified customers who may present a credit question. When a pre-established limit for that customer is reached an alarm may be originated and/or further toll calls by that customer may be blocked, or other appropriate action taken.

BRIEF DESCRIPTION OF THE DRAWING

The invention will be understood and its numerous objects and advantages will become more apparent to those skilled in the art by reference to the following drawings, in conjunction with the accompanying specification, in which.

DETAILED DESCRIPTION

Figure 1:
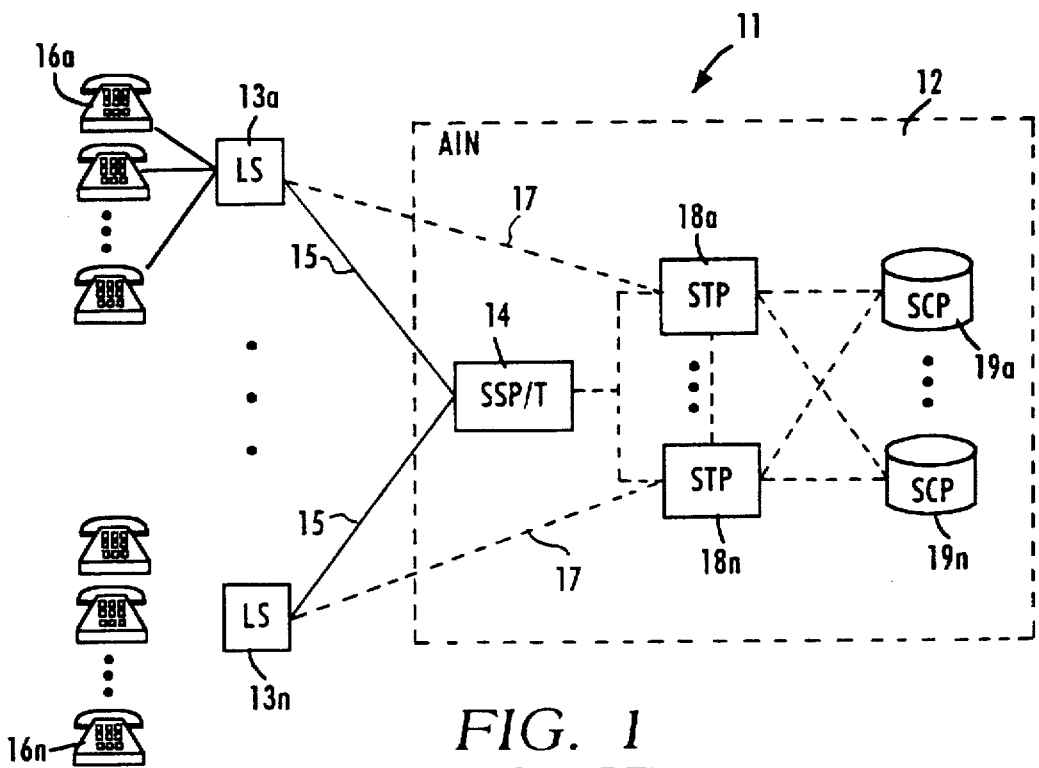
FIG. 1 (Prior Art) is a simplified block diagram of a typical telecommunications system using an Advanced Intelligent Network (AIN) to provide enhanced subscriber services.
Figure 2:
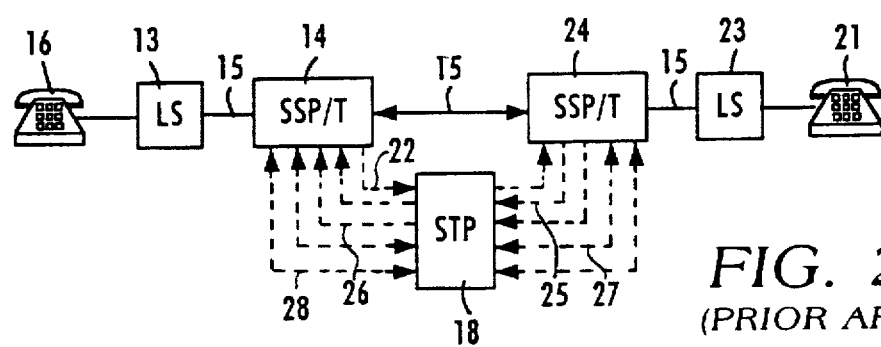
FIG. 2 (Prior Art) is a simplified block diagram illustrating a typical message flow utilized for call setup between two local telephone switches (LSs) which have not been upgraded to utilize the Integrated Services Digital Network User Part (ISUP) call-setup protocol.
Figure 2A:
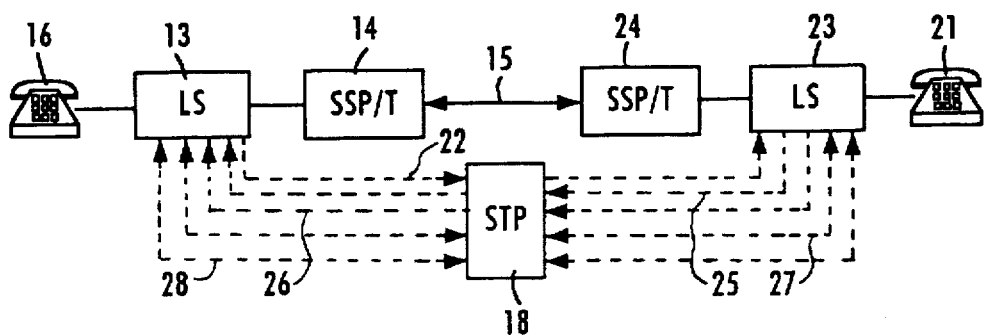
FIG. 2a (Prior Art) is a simplified block diagram illustrating a typical message flow utilized for call setup between two LSs which have been upgraded to utilize the ISUP call-setup protocol.
Figure 3:
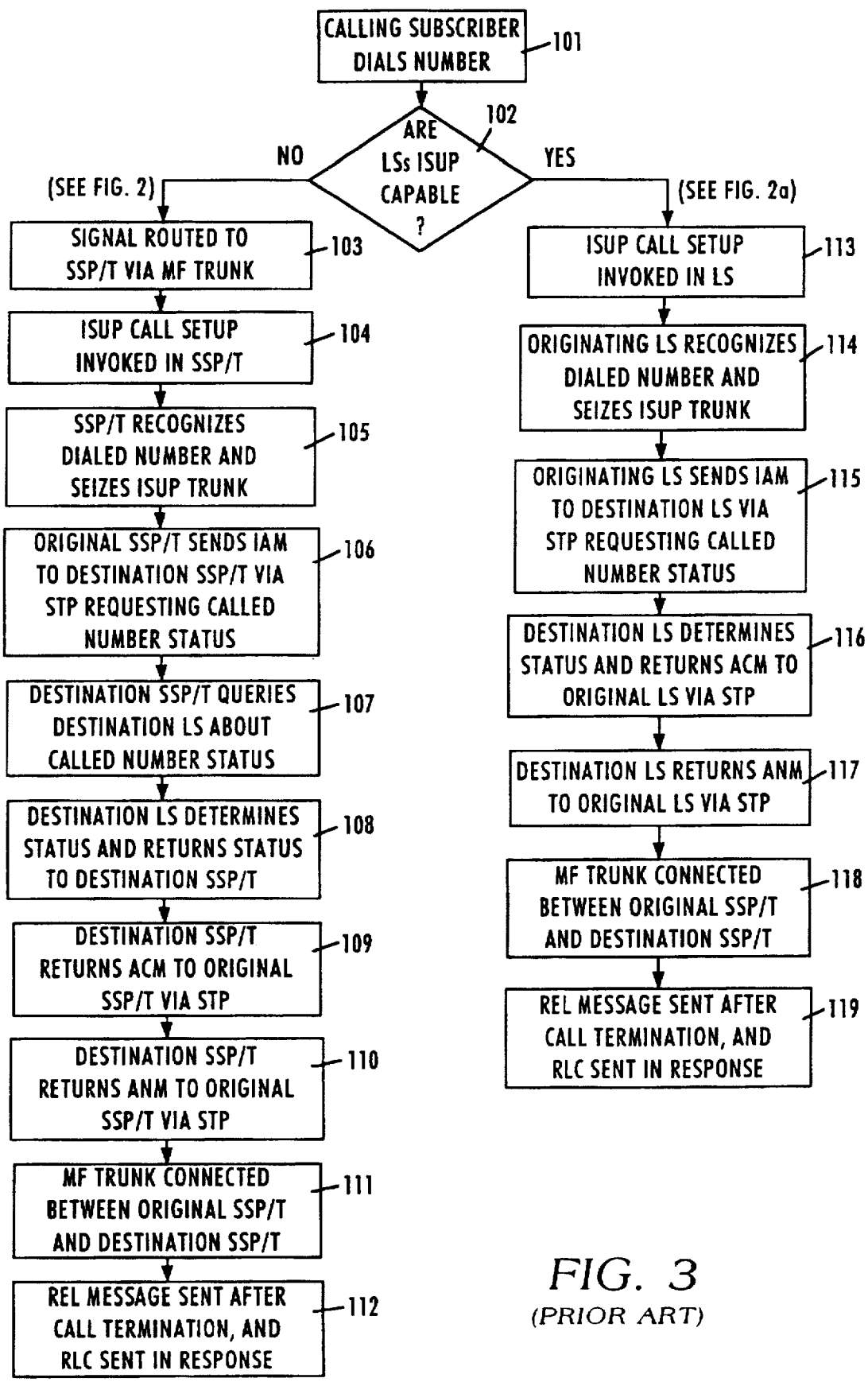
FIG. 3 (Prior Art) is a flow chart illustrating the typical message flows involved in setting up a call via the ISUP call-setup protocol, for both non-ISUP and ISUP-capable LSs.
Figure 3A:
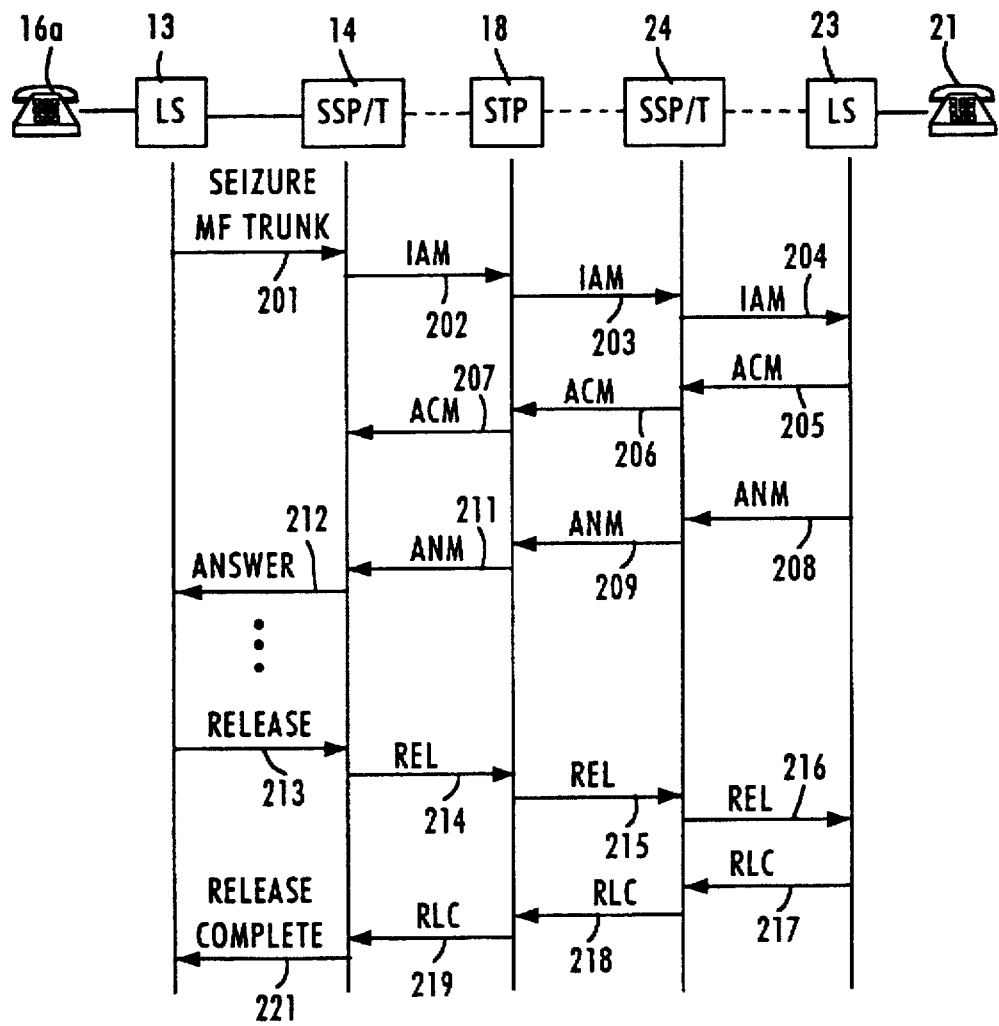
FIG. 3a (Prior Art) is a message flow diagram illustrating the flow of messages from a non-ISUP LS to an ISUP-capable LS during call setup and call release.
Figure 4:
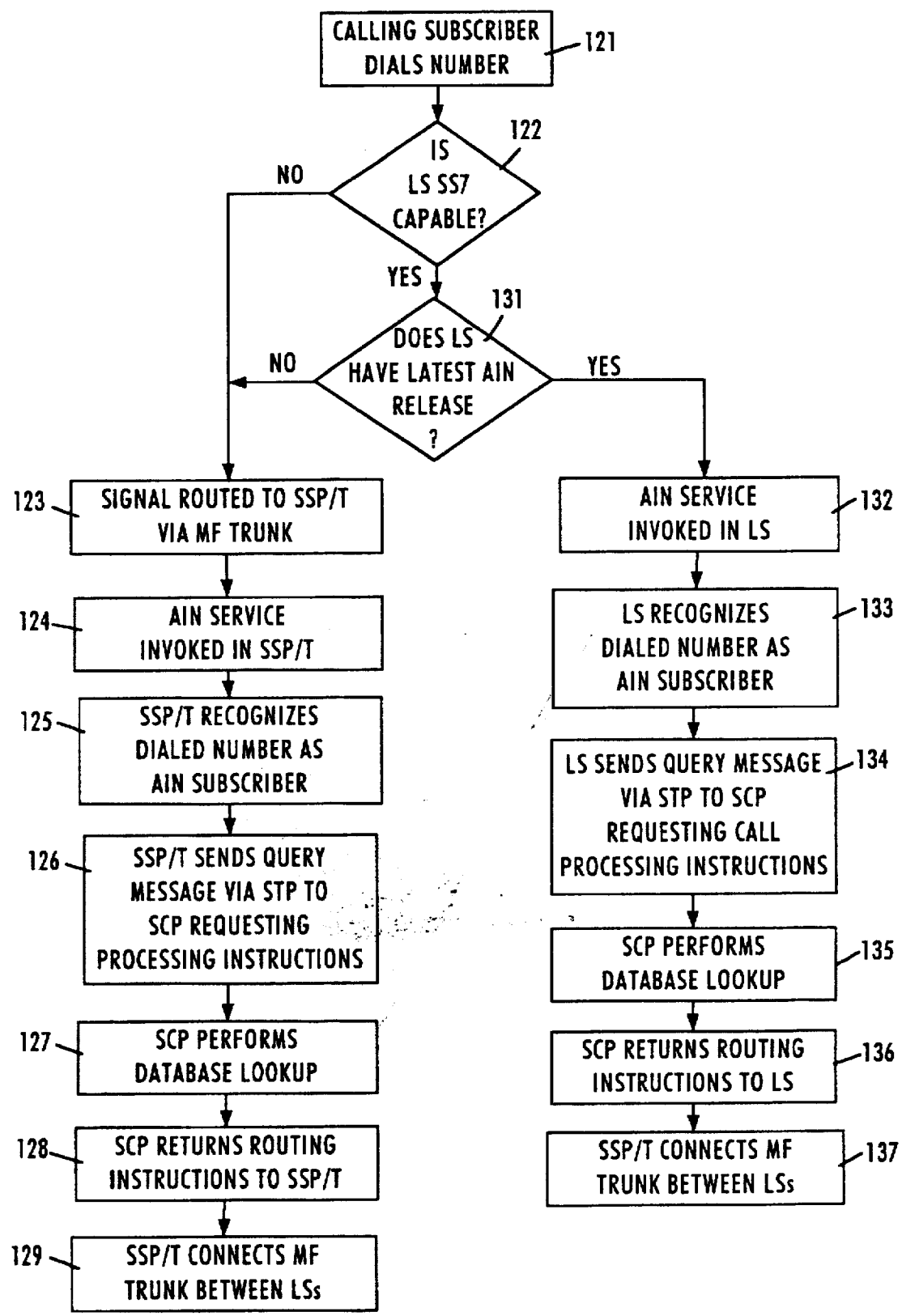
FIG. 4 (Prior Art) is a flow chart illustrating the message flows involved in determining the type of access provided for different LSs, and in the method of service retrieval, from a database stored in a Service Control Point (SCP).
Figure 5:
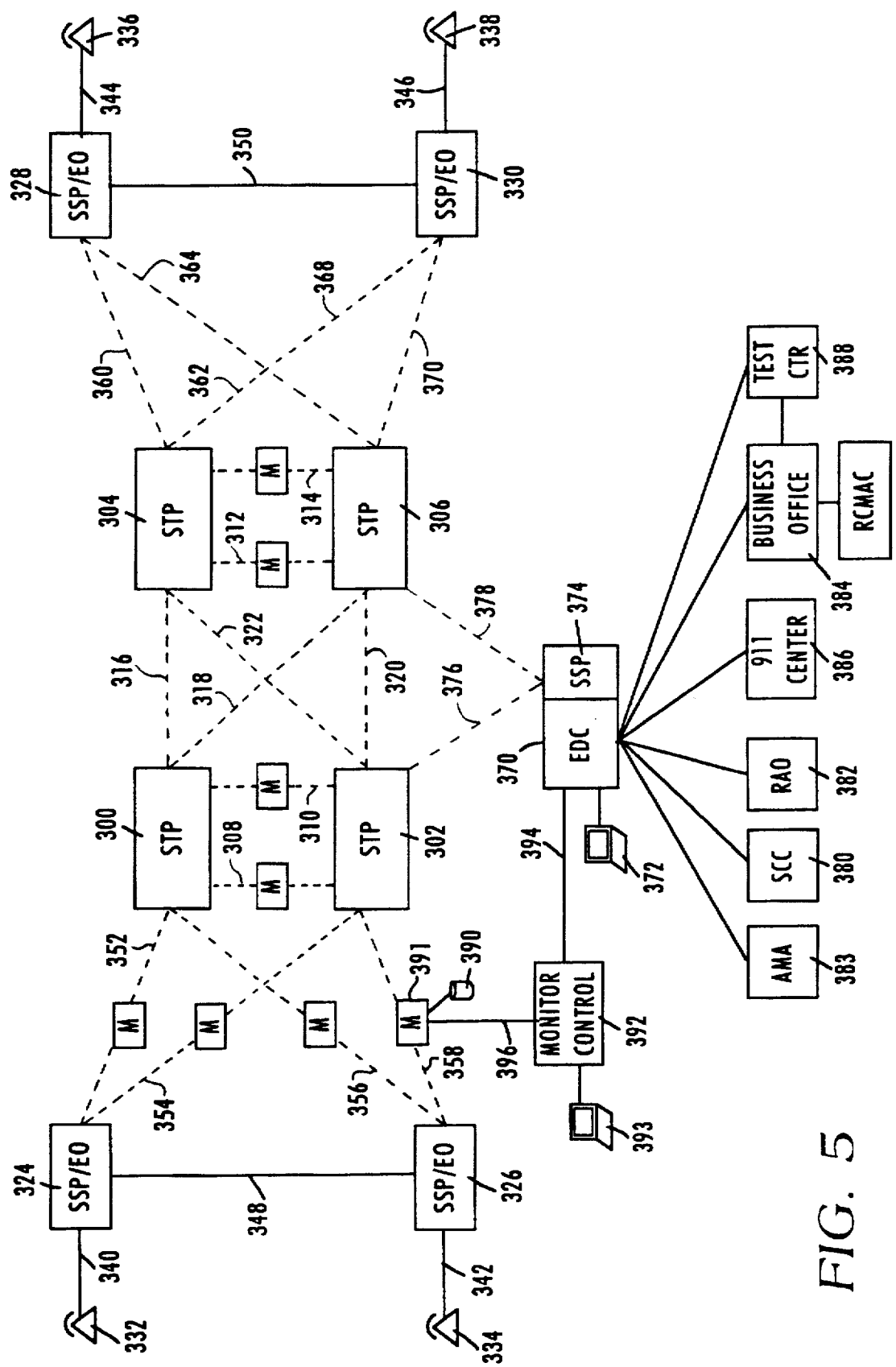
FIG. 5 is a simplified block diagram illustrating a preferred embodiment of the portion of a switched telecommunications network using the event detection and control system of the present invention.

FIG. 5 is a simplified block diagram of the common channel signaling control network for a switched telecommunications system showing a portion of the common channel signaling system as utilized according to the invention. Referring to that figure the common channel signaling or AIN network is shown as including a first mated pair of STPs 300–302 and a second mated pair of STPs 304–306. The mated pairs of STPs are connected to one another by C links 308, 310, 312, and 314. Each mated pair serves its respected transport area. It will be understood that there may be multiple mated pairs per region, one for each designated transport area. STP 300 is connected to STP 304 by B link 316 and to STP 306 by D link 318. STP 302 is connected to STP 306 by B link 320 and to STP 304 by D link 322. The STPs are connected to SSPs 324, 326, 328, and 330. The SSPs 324–330 comprise End Offices (EOs) or Local Switches (LSs) having SS7 signaling capability or TCAP/AIN communications protocol capability. Subscriber telephones 332, 334, 336, and 338 are connected to the end offices by voice lines 340, 342, 344, and 346. The SSPs are connected together by illustrative trunks shown at 348 and 350. The SSPs are connected to the STPs by A links 352–368.

The SS7 network constitutes a highly redundant data network, generally a 56K switched data circuit. By way of example, an SS7 message from end office or Local Switch 324 to end office or Local Switch 328 might travel any one of eight possible routes. It could go from 324 to STP 300, from STP 300 to STP 304, STP 304 to SSP or LS 328. One variation on that route would be from STP 300 down the D link 318 to STP 306 to SSP/LS 330, and so forth. In the event a link between STP 300 and SSP/LS 328 was lost, an SS7 route could be established from end office 324 to SSP/LS 330 via STP 300 to STP 304 and the via C link 312 to STP 306 and then via A link 370 to SSP/LS 330. However, that would be an undesirable route unnecessarily using the C link. A links provide direct connectivity while C links provide circuitous routes using extra switches, a situation to be avoided. An alternate route would be from STP 300 via D link 318 to STP 306 via A link 370 to SSP/EO 330.

According to the invention an Event Detection Center (EDC) 370 is connected to the common channel signaling network via an SSP 374 and A links 376, 378. The EDC includes a processor and storage and operator terminal 372. The EDC is also connected via MF lines to the Switching Control Center (SCC) 380, Revenue Accounting Office (RAO) 382, Business Office (BO) 384, 911 Center 386, Test Center 388 and Automatic Message Accounting Office (AMA) 389. The business office is connected to the RCMAC and to the Test Center. The AMA is connected to the RAO.

Each STP is provided with a series of monitors M with one monitor bridged onto each STP link, each monitor having receive and transmit ports. As will be understood by those skilled in the art, each SSP has a point code comprising a nine-digit code assigned to every node in the network. Each operating company has its own network ID normally represented by three digits in the point code. The point code also contains a three-digit cluster number. A cluster can hold 32 SSPs, the SSPs being designated by the final three numbers. According to the invention the monitors M are addressable and have individual point codes for control and programming purposes.

The monitors include processors and temporary storage as indicated by way of example at 390 connected to the monitor M 391 in FIG. 5. It will be understood that each of the remaining monitors M includes a similar processor and storage. Each of the monitors in a cluster for an STP is connected to a monitor controller 392. The controller 392 includes a processor and storage and may be provided with a terminal 393. The monitors and processors may be of the type described in allowed copending application Ser. No. 08/018,457, filed Feb. 16, 1993 (Attorney docket 680-062) and assigned to the assignee of the instant application. Application Ser. No. 08/018,457 is incorporated by reference herein in its entirety.

As described in further detail in the aforesaid application the monitors are controllable from remote stations to set traps which may be customized. Thus the monitors are programmed to trap packets and/or selectable fields and/or field contents on a real time basis to permit extremely rapid response to detected conditions. The system and method of the invention are applicable to not only a localized or regional communications network but also to a virtually unlimited interconnection of such networks. The monitors may comprise the monitor circuit card physically mounted at a monitor controller 392 that holds all monitor cards for that cluster. The monitor controller includes a 386 or the like type controller and memory or storage that keeps track of all 32 monitors and handles any messages.

The controller 392 and its monitors M may be regarded as an interface with the SS7 network. The equipment may be conveniently mounted at or adjacent to the STP with which the monitors are associated. A function of the monitor controller is recording all of the data forwarded by the monitors M.

The controller 392 may be similar to the stage one controller described in the aforesaid co-owned application Ser. No. 08/018,457. The controller 392 is connected to the event detection center 370 via a data link 394. The monitors may physically constitute a back plane capable of handling multiple cards. The monitor cards themselves include multiple monitors such as four monitors per card. According to the invention the monitors may be programmed by monitor control signals delivered either via the SS7 or CCS network or via the data link between each monitor M and its associated monitor controller 392. In the first instance control signals may be delivered to specifically addressed monitors over the CCS links 376 and 378 in FIG. 5. In the latter instance the control signals are delivered over the line 394 connecting the EDC 370 to the monitor controller 392 and thence over the data link 396 from the monitor controller 392 to the processor and storage 390.

The processor in the event detection center 370 may be loaded with the desired program or script via the terminal 372. This script will specify for identified monitors the particular signals or portions of signals to be trapped and the nature of the output signal to be delivered to the monitor controller 392. The monitor controller receives this designated information from all specified monitors in its cluster and provides an output signal to the event detection center processor 370 upon the occurrence of predetermined conditions as specified by the event detection center processor. The event detection processor in turn responds to the receipt of these output signals from the monitor controller by directing to the SS7 or CCS network over the links 376, 378 routing or other control information direct the handling of predetermined calls. The following are illustrative examples of event control according to the invention.

A subscriber to the Event Detection and Control Service (EDCS) calls the Business Office or Event Detection Center (EDC) and explains that he/she desires to prevent unauthorized international telephone calls from his/her home phone. It is explained that such calls have occurred and been billed during the work day at times when the foreign-born domestic help was alone on the premises. It is desired to block the calls and make a record for the subscriber of any calls which are attempted.

Having gathered the necessary information the operator at the Business Office or at the EDC uses a terminal located at that point to enter into the EDC processor a script or program to:

1—Identify the SS7 or CCS links to the SSP/EO to which the subscriber's home telephone is connected and identify the addresses of the monitors on those links.

2—Send a signal from the EDC computer via either the SS7/CCS links or the monitor controller to the identified addressed monitors in the specified links.

3—Through such signals set the monitors to trap data signals on the specified links which are caused by the placing of calls from the subscriber's home telephone. The trapped signals are stored in the temporary storage associated with the monitors.

4—Program the monitors and monitor controller to send to the monitor controller those stored signals from the subscriber's terminal or telephone which have a destination number with an international prefix, while discarding the remaining temporarily stored signals.

5—Program the monitor controller to provide an output signal to the EDC processor indicating the real time receipt of such signals.

6—Also programming the EDC processor to react to the receipt of the monitor controller output signal by transmitting a signal to the Automatic Message Accounting (AMA) or Station Message Detail Recording (SMDR) Office for dispatch to the Revenue Accounting Office (RAO) for billing of the service and reporting the events that occurred.

7—Still further programming the EDC processor to also transmit via its associated SSP to the SS7/CCS network a signal to cause the SSP/EO to whom the subscriber terminal is connected to either deliver to the subscriber's telephone a busy signal or a 2-tone signal followed by an announcement such as "This call cannot be completed as dialed." Alternatively, the signal from the EDC directs the SSP/EO connected to the subscriber's terminal to terminate the call at the subscriber's mail box in the Voice Messaging System associated with the subscriber's SSP/EO. The VMS may then deliver a message of the subscriber's choice, such as, "You are attempting to make an unauthorized long distance telephone call which will not be permitted from this telephone." As a third alternative, the message to the SSP/EO may direct the switch to allow the call to simply time out.

According to any of the above scripts, the prohibited call is stopped after the IAM is sent by the SSP/EO and before the ACM is returned from the SSC for the addressed Point of Presence (POP) of the Interexchange Carrier (IC). No special programming needs to be entered in any SSP or STP and an SCP or ISCP is not utilized.

Figure 6:
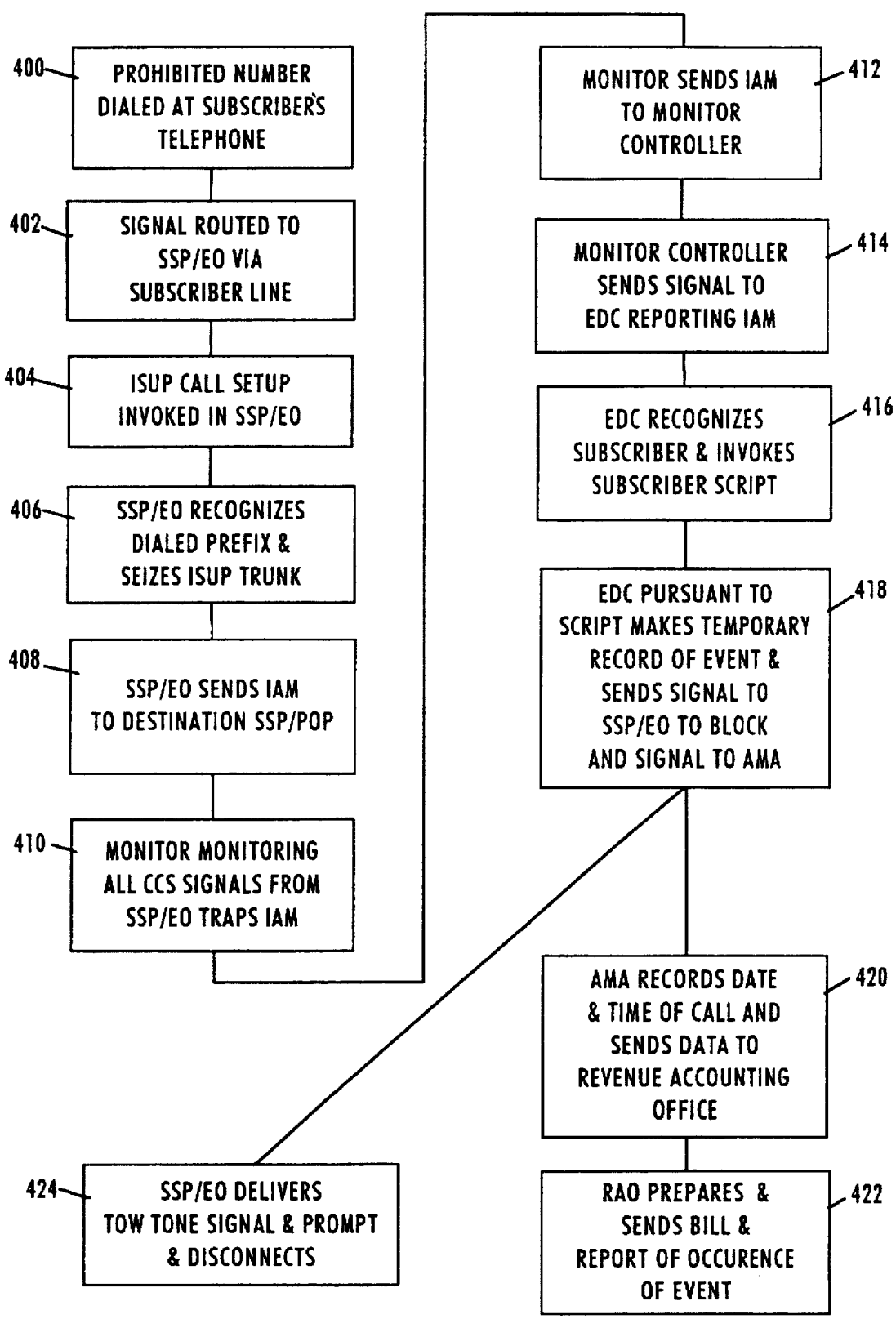
FIG. 6 is a message flow diagram illustrating the operation of the system according to one embodiment of the invention.

FIG. 6 presents a message flow diagram illustrating the operation of the system according to this application of the invention. At 400 an unauthorized call is placed by dialing a prohibited number at the subscriber's telephone. At step 402 the call is routed to the SSP/EO of the subscriber telephone via the subscriber line. At step 404, ISUP call set up is invoked in the SSP/EO. At 406 the SSP/EO recognizes the dialed prefix and seizes an ISUP trunk. At 408 the originating SSP/EO utilizes the ISUP call set up protocol to send an Initial Address Message (IAM) to the SSP serving the interexchange carrier's (IC) Point of Presence (POP). At 410 one of the monitors monitoring the links from the subscriber's SSP/EO traps the IAM. At 412 the monitor sends the IAM to the monitor controller. The monitor controller in turn generates a reporting signal and sends the signal to the EDC reporting the IAM at 414. At 416 the EDC recognizes the identity of the subscriber from the signal and invokes the processor script previously stored in response to the subscriber request and order. At 418 the EDC, pursuant to the script, makes a temporary record of the event and sends a signal to the subscriber's SSP/EO to block the call, and also sends a signal to the AMA to record the event. At 420 the AMA records the date and time of the call and sends the data to the Revenue Accounting Office. The Revenue Accounting Office prepares and sends a bill and report of the occurrence of the event at 422. Pursuant to the subscriber script, the EDC at 418 also sends a message to the subscriber's SSP/EO. At 424 the subscriber's SSP/EO delivers to the subscriber line a 2-tone signal and prompt such as "Your call cannot be completed as dialed." The call is then disconnected.

Pursuant to another specific application of the invention a subscriber may wish to limit the number of calls placed from the subscriber's telephone to a specified number during the day when the subscriber is at work. The subscriber calls the Business Office or EDC and explains that he/she desires to block during specified working hours all calls from the subscriber's telephone to a specified destination directory number which exceed a specified number, for example, ten (10). The subscriber also requests notification of each time that the limit is exceeded. The operator at the business office or the EDC through a terminal located at that point enters into the EDC processor a script or program to:

1—Identify the SS7 or CCS links to the SSP/EO to which the subscriber's home telephone is connected and identify the addresses of the monitors on those links.

2—Send a signal from the EDC computer via either the SS7/CCS links or the monitor controller to the identified addressed monitors in the specified links.

3—Through such signals set the monitors to trap IAM signals on the specified links which originate from the subscriber's telephone and are addressed to the directory number specified by the subscriber. The trapped signals are stored in the temporary storage associated with the monitors.

4—Program the monitors and monitor controller to send to the monitor controller those stored signals which are addressed to the specified directory number and originate from the subscriber's number.

5—Program the monitor controller to provide an output signal to the EDC processor indicating the real time receipt of such signals.

6—Program the EDC processor to count such signals and upon the occurrence of the eleventh such signal to transmit a signal to the AMA for transmittal to the RAO for billing purposes and reporting of the events that occurred.

7—Program the EDC processor to also send a message via its associated SSP to the SS7/CCS network a signal to cause the SSP/EO to which the subscriber telephone is connected to block the eleventh and subsequent dialed calls. This may be by transmitting a 2-tone signal followed by a prompt such as "This call cannot be completed as dialed." The call also may be blocked by a signal from the EDC to the SSP/EO directing the SSP/EO to terminate the call at the subscriber's mail box which may deliver a message of the subscriber's choice. The call also may be blocked by the SSP/EO transmitting a busy signal and/or by simply allowing the call to time out.

Figure 7:
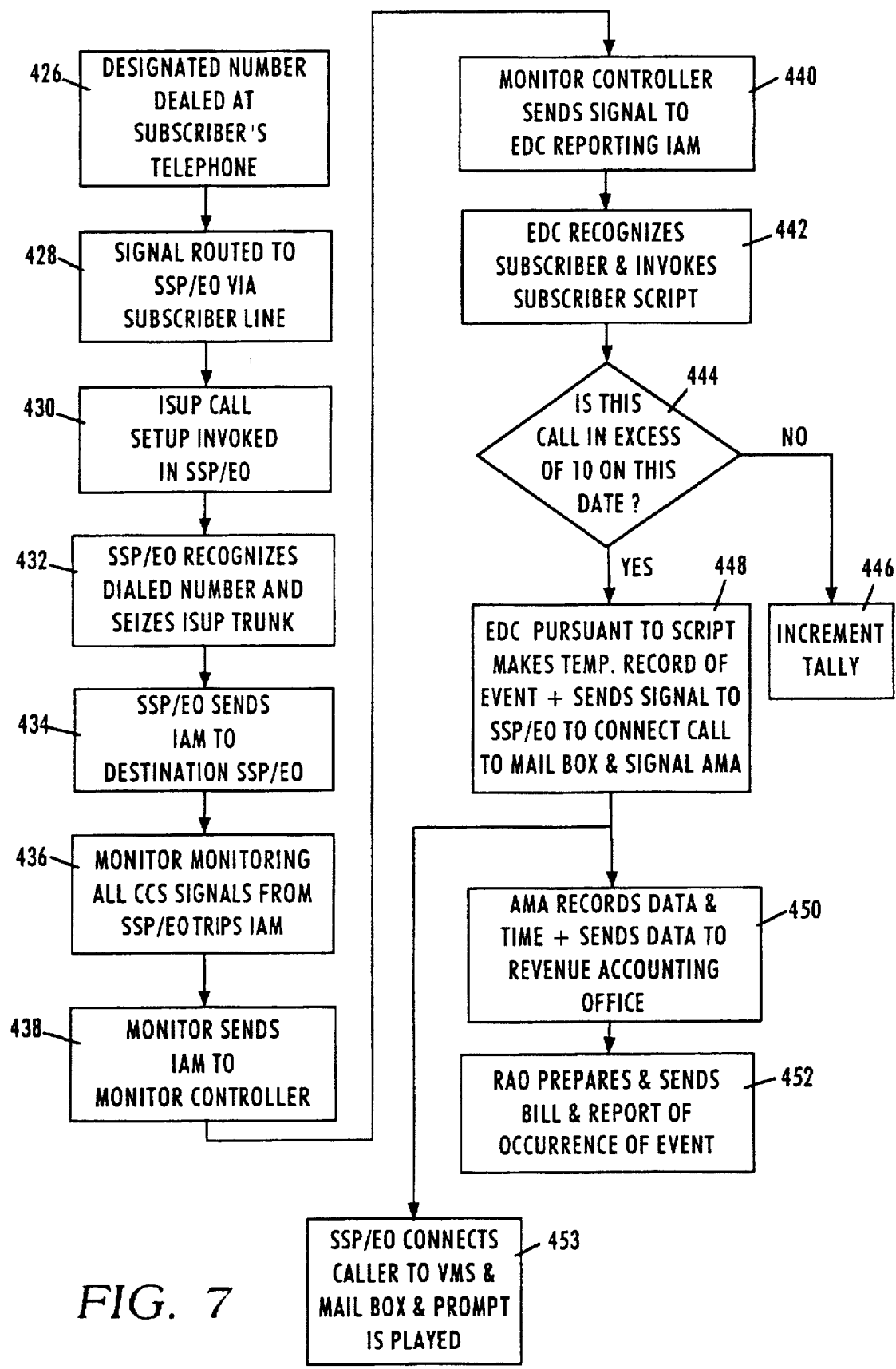
FIG. 7 is a message flow diagram illustrating the operation of the system according to another embodiment of the invention.

FIG. 7 is a flow chart illustrating a typical manner in which the above described signal handing may occur.

At 426 the directory number designated by the subscriber is dialed at the subscriber's telephone during the specified time frame. At 428 the dialing signal is routed to the SSP/EO via the subscriber's line. At step 430 ISUP call set up is invoked in the SSP/EO. The SSP/EO recognizes that the dialed directory number is a number which requires ISUP routing and seizes an ISUP trunk at 432. At 424 the originating SSP/EO utilizes the ISUP call set up protocol to send an Initial Address Message (IAM) to the destination SSP/EO asking for the status of the dialed subscriber's telephone. At 436 a monitor monitoring all CCS signals from the subscriber's SSP/EO traps the IAM. At 438 the monitor sends the IAM to the monitor controller. The monitor controller sends a signal to the EDC reporting the IAM at 440. At 442 the EDC recognizes the subscriber and dialed number and invokes the subscriber script relating to those two numbers. At step 444 it is determined whether or not the call represented by this IAM exceeds ten (10) for this specified time frame. If not, the tally in the processor is incremented at 446. If the call is in excess of ten (10) the EDC pursuant to the script makes a temporary record of the event and sends a signal to the SSP/EO to block the call and send a signal to the AMA to record the event. At 450 the AMA responds to this signal by recording the date and time of the call in excess of ten (10) and sends corresponding data to the Revenue Accounting Office. The Revenue Accounting Office prepares and sends a bill and report of the occurrence at 452. The EDC also sends a signal to the SSP/EO to connect the call to the subscriber's mail box. At 452 the SSP/EO connects the caller to the subscriber's mail box which delivers a prompt of the subscriber's choosing. Following the delivery of that prompt the caller hangs up or the mail box times out.

While the foregoing application of the invention is effectuated using monitors in the CCS links to the SSP/EO for the subscriber's line it is also within the purview of the invention to perform the monitoring in the CCS links to the SSP/EO connected to the called station. The invention also comprehends that monitoring may be done in both the links connected to the origination SSP/EO and the destination SSP/EO. This mode permits monitoring of the circuit conditions and trouble detection.

It will be seen from the foregoing that the invention provides a system and a method for utilizing the common channel signaling network to detect predetermined events and to execute a predetermined script upon a detection of those events. This is accomplished utilizing the common channel signaling network in conjunction with programmable and addressable monitors associated with the common channel signaling links connected to the STP's. These monitors are programmed to trap and temporarily record predetermined data associated with specific events which it is desired to block or control. The monitors provide an output to a control processor having an SSP capability which is linked to the STP's. The monitors are programmed either through the common channel signaling network or through a monitor port connected to the control processor.

Figure 8:
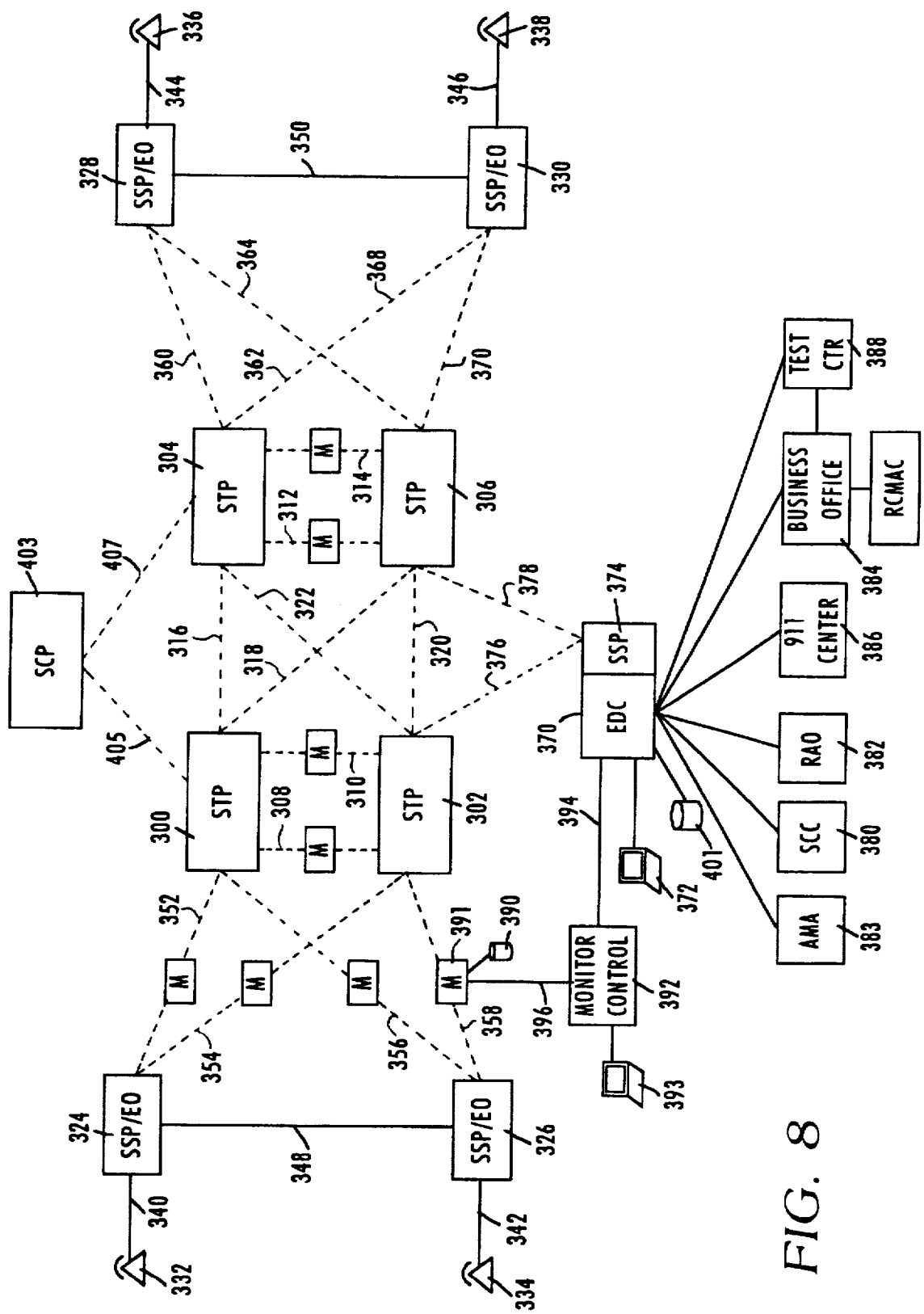
FIG. 8 is a simplified block diagram similar to FIG. 5 illustrating a preferred embodiment of the network using the event detection and control system of the invention in conjunction with a credit database.
Figure 9:
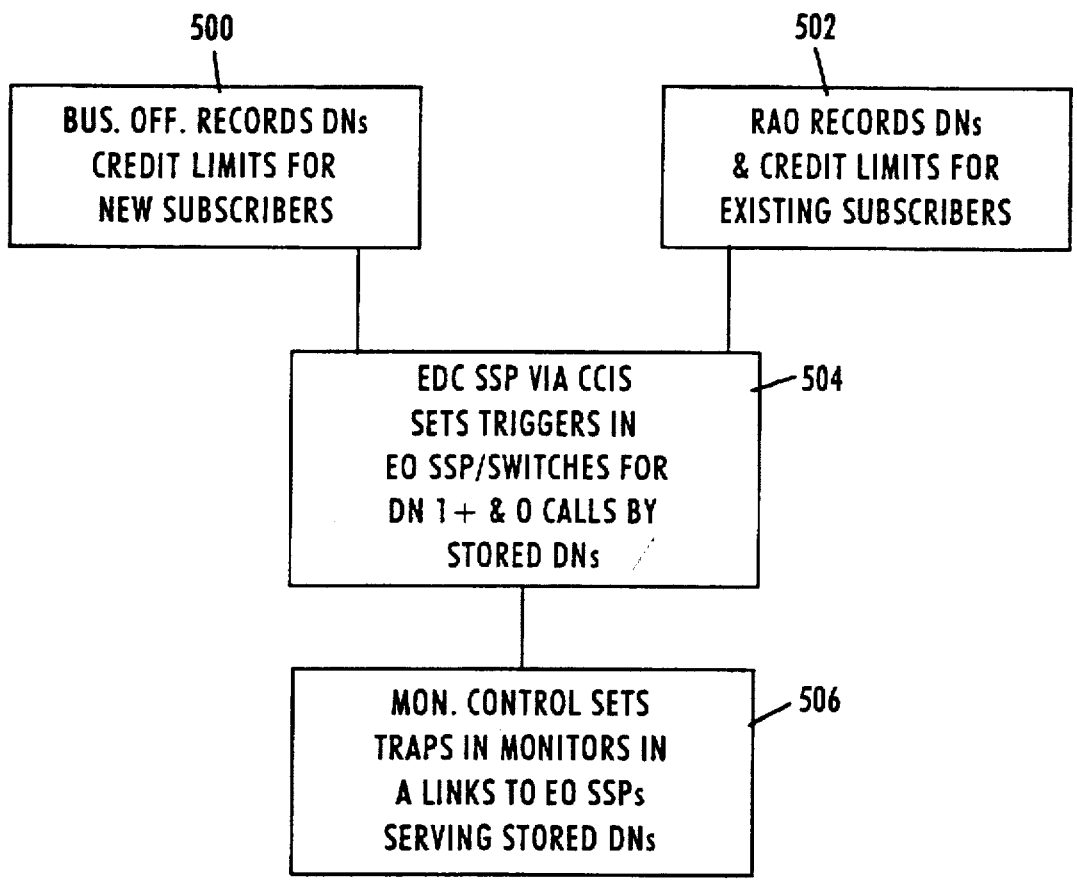
FIG. 9 is a simplified flow diagram showing the programming or setup of this embodiment of the system of the invention to detect and act to prevent credit fraud.
Figure 10:
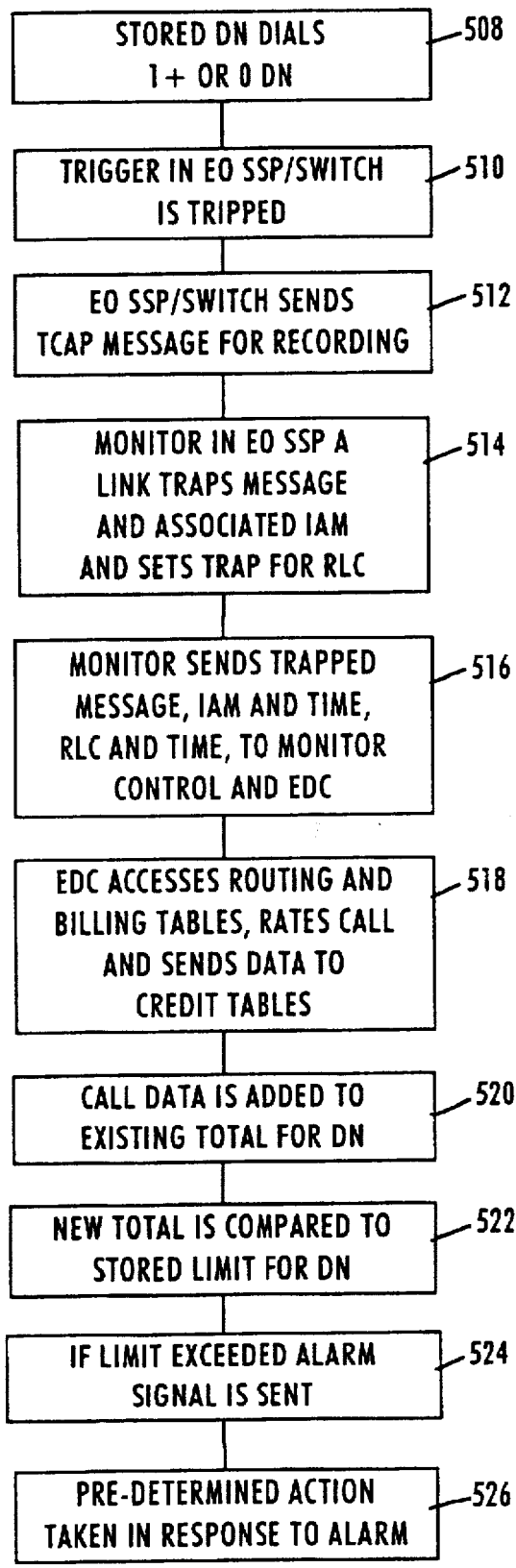
FIG. 10 is a simplified flow diagram showing the operation of the system to detect and act to deter or prevent credit fraud.

Referring to FIGS. 8 through 10 there is illustrated another embodiment of the invention for detecting and limiting toll charge credit fraud.

FIG. 8 is a simplified block diagram of the common channel signaling control network for a switched telecommunications system showing a portion of the common channel signaling system as utilized according to the invention to detect and act upon credit fraud. FIG. 8 is the same as FIG. 5 with the addition of the credit record storage 401 in the event detection center 370. Also seen in FIG. 8 is a depiction of an SCP 403 connected to the STPs by exemplary links 405 and 407. The reference numerals in FIG. 8 are the same as the reference numerals in FIG. 5 for common elements.

According to this embodiment of the invention the event detection center 370 is provided with a credit information storage database 401. This database may comprise additional storage in the processor of the event detection center or may be a separate storage for credit information only. Stored in the database is a list of directory numbers or other customer identifications, a list of corresponding toll credit limits, and a list of the current toll charge total for each listed customer.

The operation of this embodiment of the invention is illustrated in the flow charts of FIGS. 9 and 10. FIG. 9 shows the setup of the system while FIG. 10 shows its operation. Referring to FIG. 9, a new subscriber is accepted by the Business Office and, on the basis of the credit evaluation available to the Business Office, is believed to warrant credit observation. At 500 the Business Office determines an initial credit limit for the new subscriber, and enters the directory number (DN) of the subscriber and the credit limit in the credit database 401.

The Business Office also maintains surveillance on the payment records of existing subscribers to identify those subscribers whose payment records indicate that such subscribers present a credit risk. The Business Office assigns a credit limit to each such existing subscriber and enters the directory number of the subscriber and the credit limit in the credit storage at 502. At or about the time of each such entry, or periodically, the event detection center 370, via the common channel signaling network, sets a trigger in the SSP of the end office switch for each directory number established in the credit database. The trigger is set to be tripped or triggered when the associated directory number dials a 0+ or 1+ call. This is indicated at 504 in FIG. 9. Upon the tripping of the trigger the SSP/switch assembles and transmits an informational TCAP signal directed to the connected STP or the SCP or ISCP. This message contains the identity of the calling station or director number, the identity of the called station or directory number, and the time of day.

Upon the setting of the triggers in the end office switches, the event detection center sends an informational signal to the monitor control 392 identifying the directory numbers to be placed under credit surveillance. The event detection center or the monitor control identifies the monitors 391 in the common channel signaling A links connected to the end office (EO) SSP/switches for the identified directory numbers. Each such monitor is programmed to trap the informational TCAP message originated at the SSP/switch serving the designated directory number and additional CCIS signaling as will be described. This is indicated in FIG. 9 at 506. As previously stated, the information in the TCAP message contains the identity of the calling and called directory numbers, the date and time, and whether the call is a 0+ or 1+ call.

Referring to the flow chart of FIG. 10, the operation of the system is as follows:

At 508 a subscriber having a directory number stored in the credit database 401 dials a 1+ or 0+ number. At 510 this triggers the previously set EO SSP/switch and the informational TCAP message is dispatched by the SSP via an A link to its connected STP. The STP either discards the TCAP message at this point or sends it to an SCP or ISCP for recording, as indicated at 512. At 514 the monitor on the used A link for the calling subscriber traps the TCAP and associated IAM and alerts the monitor to detect and trap the responsive ANM and the RLC or call disconnect signal. At 516 the monitor sends the trapped message, IAM, ANM, date and time, and RLC, date and time, to the monitor control 392, and thence to the event detection center 370. Alternatively the monitor may send this information in segments with temporary storage in the monitor control or event detection center until the complete information set is received.

At 518 the event detection center accesses the appropriate routing and billing tables in the network, pseudo-bills the call, and sends the originating directory number and billing information to the credit limit storage 401. Through action of the event detection processor and the data in the credit limit storage this additional billing is added to the existing total in storage for that directory number. This step is illustrated at 520. At 522 the new total is compared to the previously set and stored credit limit for that directory number. If the new total exceeds the limit the event detection center generates an alarm signal and sends that signal to the Revenue Accounting Office (RAO) 382 for appropriate action. This is illustrated at 524. At 526 the RAO may then take appropriate action, as by notifying the subscriber. The event detection center may also dispatch an appropriate TCAP message to the affected EO SSP/switch to block further toll calls from that directory number.

It will be seen from the foregoing that this embodiment of the invention provides a readily implemented surveillance of known toll credit risks. Suitable alarms and/or automated preventive action may then be initiated to prevent or at least minimize toll credit fraud. The system may operate on both 0+ and 1+ calls and provide real time corrective action.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In a communication system comprising a switched network connected by program controlled switches (PCSs) controlled by a data switched common channel signaling (CCS) network including signal transfer points (STPs) connected to said program controlled switches at signal switching points (SSPs) via links between said SSPs and STPs, and a subscriber terminal connected to an end office switch associated with an SSP (SSP/EO) and having a directory number associated therewith, a method comprising the steps of:

a) establishing a storage of selected subscriber identities and accounts and account limits applicable to said subscriber identities, including an account limit for said directory number associated with said subscriber terminal;

b) setting an originating trigger in the SSP/EO to which said terminal is connected for toll calls initiated by said directory number;

c) responsive to actuation of said originating trigger by a toll call initiated by said terminal, monitoring selected links in said CCS network to determine the identity of the terminal called in said toll call and the duration of said call;

d) responsive to said determination computing a charge amount for said toll call attributable to said account for said directory number for said subscriber terminal and incrementing said account by said charge in said storage;

e) comparing said account limit for said directory number associated with said subscriber terminal with the incremented account value;

f) responsive to the value of said incremented account reaching said account limit initiating signaling in said communication system.

2. A method according to claim 1 including the step of responding to said signaling in said communication system with a CCS message to said SSP/EO blocking further toll calls from said subscriber terminal.

3. A method according to claim 1 wherein said incrementing of said account in said storage and said comparison occurs substantially immediately following determination.

4. A method according to claim 3 wherein said storage is independent of subscriber billing procedures.

* * * * *